March 22, 1938.  C. G. STRANDLUND  2,111,821
WHEEL MOUNTING
Filed May 3, 1937
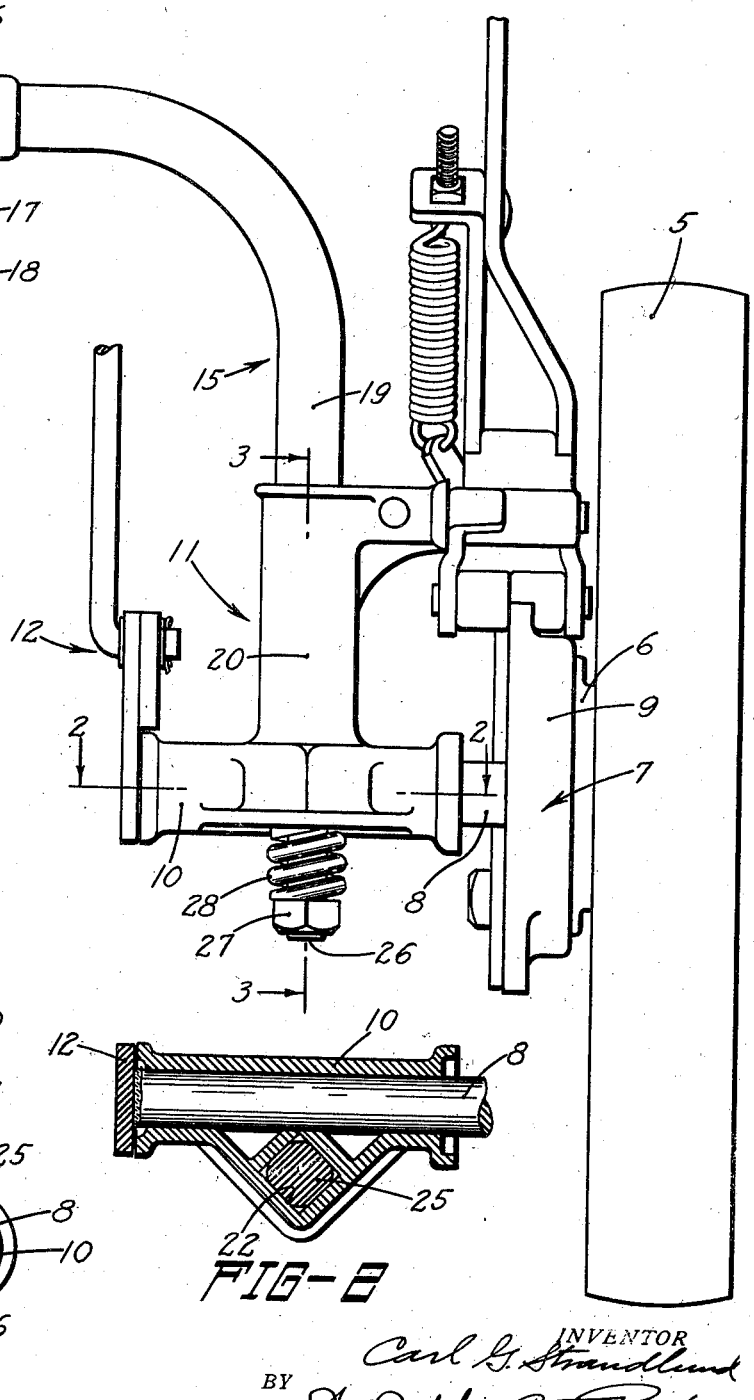
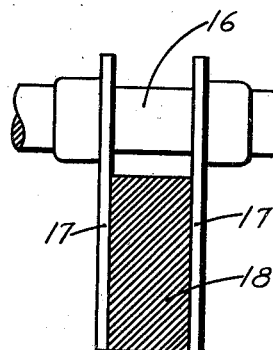
INVENTOR
Carl G. Strandlund
BY
ATTORNEYS Patented Mar. 22, 1938

2,111,821

UNITED STATES PATENT OFFICE 2,111,821

WHEEL MOUNTING

Carl G. Strandlund, Moline, Ill., assignor to Deere & Company, Moline, Ill., a corporation of Illinois Application May 3, 1937, Serial No. 140,331

3 Claims. (Cl. 97—103)

The present invention relates generally to wheel mountings and more particularly to a land wheel mounting for a plow carried on crank arms, which are swingable in vertical planes to raise and lower the plow between raised or transport position and lowered or ground working position.

The land wheel of a plow is usually assembled on a casting with a lifting clutch mechanism, the casting being fixedly supported at the free end of the swingable crank arm. Since the wheel is necessarily offset laterally from the crank arm, there is a moment set up which tends to twist or rotate the casting on the crank arm. The principal object of my invention is to provide a rigid mounting that will not allow the wheel supporting casting to twist on the crank arm and which will not loosen due to vibration and wear of the parts.

Heretofore, it has been common practice to provide merely a square socket in the wheel supporting casting to receive the squared end of the crank arm. Such mountings have been known to become loose however, due to the minute irregularities in the cooperative surfaces of the socket and arm being flattened down during extended operation, either by wear between the parts or by the compacting of the metal by pressure. This is cured by giving a slight taper to the socket and arm, but in such case, there is a gradual settling of the arm into the socket coincident with such flattening of irregularities, since the weight of the plow, when in transport position, acts substantially longitudinally of the arm. Because of this settling, there is an appreciable movement of the arm into the socket, whereby the securing nut at the end of the arm is moved away from the face of the casting. Then, when the plow is lowered into operative position with the crank arm nearly horizontal, the tendency for the weight of the plow to force the arm into the socket is greatly decreased, whereby the arm tends to become loose in the socket. This loosening of the parts allows the securing nut to gradually back away on the stud.

I have found that by providing a strong helical spring positioned to maintain a continuous pressure tending to force the arm deeper into the socket, the arm and socket are held in firm seating engagement regardless of the amount of settling that takes place between them, thus preventing them from becoming loose when the arm is in horizontal position. Furthermore, since the spring maintains a strong pressure against the nut at all times, the latter is prevented from backing away on the threaded portion of the arm.

I will now describe the construction of an embodiment of my invention, reference being had to the drawing appended hereto, in which Figure 1 is a front elevation of a wheel mounting embodying the principles of my invention;

Figure 2 is a sectional view taken along a line 2—2 in Figure 1; and

Figure 3 is a sectional view taken along a line 3—3 in Figure 1.

Referring to the drawing, the implement wheel 5 is supported in conventional manner, upon the normally rotative member 6 of a lifting clutch 7 of any suitable type known in the art. The wheel and clutch assembly is supported on an axle 8, which is fixed to the optionally rotative member 9 of the clutch 7, in well known manner. The axle is journaled in a transversely extending sleeve bearing portion 10 of a wheel supporting casting 11, and extends therethrough to lifting linkage 12, by means of which the implement is raised by power taken from the wheel 5 when the clutch 7 is engaged.

The casting 11 is carried on a crank arm 15, having a horizontal bearing portion 16 rotatably supported in bearing plates 17 fixed to a beam 18, which forms part of the implement frame, and an arm portion 19 which is swingable in a vertical plane about the axis of the bearing portion 16. The casting 11 is provided with a second sleeve or socket portion 20, formed integrally with the sleeve bearing portion 10 and disposed substantially at right angles thereto but offset therefrom, as indicated in Figure 3. The sleeve portion 20 is provided with a cylindrical bore or socket 21 adapted to receive the free end of the arm 19. The lower end 22 of the bore or socket 21 is of polygonal cross-section, preferably square, as indicated in Figure 2, and is tapered toward the lower end thereof. The socket terminates at an aperture 24 in the end surface 24' of the casting 11.

The end of the arm 19 has a squared tapered section 25 adjacent the extremity, which is adapted to cooperate with the squared tapered socket portion 22 to prevent relative rotation of the arm 19 and casting 11. The arm 19 terminates in a stud portion 26, the end of which is threaded to receive a securing nut 27. The stud portion 26 extends out of the casting through the aperture 24.

The casting 11 is forced upwardly on the arm 19 to maintain the tapered socket portion 22 in firm seating engagement with the tapered end section 25, by means of a strong helical compression spring 28 having a plurality of coils coaxially encircling the stud portion 26. The spring 28 bears at one end thereof on the nut 27 and reacts against the end surface 24' of the casting 11.

When the nut 27 is tightened against the spring, it is secured against loosening and backing away on the stud, and the casting is maintained tightly on the arm, regardless of any gradual movement of the casting longitudinally on the arm, occasioned by the settling of the tapered end 25 into the socket 22 as minute irregularities in the tapered surfaces become flattened.

I claim:

1. In an agricultural implement, the combination of a crank arm having a tapered portion formed with a plurality of flat sides adjacent one end thereof and a threaded stud extending beyond said portion, a wheel-supporting casting having a tapered socket, adapted to receive and cooperate with said flat sided tapered portion, and an aperture at the end of said socket to receive said stud, a nut engaging the end of said stud, and a helical spring having a plurality of coils coaxially encircling said stud, one end of said spring being disposed to bear against said nut for urging said tapered portion into seating engagement within said tapered socket, the other end of said spring reacting against the outer surface of said casting.

2. In an agricultural implement, the combination of a crank arm having means providing a seat spaced from one end thereof, a wheel-supporting member having a socket adapted to receive said arm, there being means disposed within said socket serving as a seat adapted to cooperate with said seat means on said arm to prevent said member from rotating on said arm, said end of said arm extending out of said member, a helical spring having a plurality of coils coaxially encircling said end of said arm, means attached at the outer end of said arm providing an abutment for one end of said spring, the other end of said spring being disposed to react against said wheel-supporting member.

3. In an agricultural implement, the combination of a crank arm for supporting said implement, said arm having a tapered portion formed with a plurality of flat sides adjacent one end thereof and a threaded stud extending beyond said portion, a wheel supporting member comprising a transversely extending sleeve bearing portion adapted to receive a wheel axle for rotation therein, and a longitudinally extending elongated socket portion offset from said bearing portion and adapted to receive said crank arm, there being a tapered section in said socket portion having flat sides adapted to cooperate with said flat sided tapered portion on said arm to prevent rotation of said wheel supporting member on said arm, and an aperture at the end of said socket to receive said stud, a nut engaging said threaded stud, and spring means disposed between said nut and said wheel supporting member for maintaining a continuous pressure tending to force said arm deeper into said socket.

CARL G. STRANDLUND.